United States Patent
Pfund

(10) Patent No.: US 7,736,150 B2
(45) Date of Patent: Jun. 15, 2010

(54) MODULE-BASED EDUCATION

(76) Inventor: Jeffrey A. Pfund, 37566 Agar Dr., Sterling Heights, MI (US) 48310

( * ) Notice: Subject to any disclaimer, the term of this patent is extended or adjusted under 35 U.S.C. 154(b) by 425 days.

(21) Appl. No.: 10/170,966

(22) Filed: Jun. 13, 2002

(65) Prior Publication Data

US 2003/0232315 A1 Dec. 18, 2003

(51) Int. Cl.
*G09B 3/00* (2006.01)
(52) U.S. Cl. .................................. 434/322; 434/350
(58) Field of Classification Search ................. 434/118, 434/322, 350
See application file for complete search history.

(56) References Cited

U.S. PATENT DOCUMENTS

| | | | |
|---|---|---|---|
| 4,622,013 A | | 11/1986 | Cerchio |
| 5,489,213 A | * | 2/1996 | Makipaa .................... 434/322 |
| 5,590,057 A | | 12/1996 | Fletcher et al. |
| 5,727,950 A | * | 3/1998 | Cook et al. ................. 434/350 |
| 5,813,863 A | | 9/1998 | Sloane et al. |
| 6,099,320 A | | 8/2000 | Papadopoulos |
| 6,155,840 A | * | 12/2000 | Sallette ....................... 434/323 |
| 6,157,808 A | * | 12/2000 | Hollingsworth ............. 434/350 |
| 6,164,974 A | | 12/2000 | Carlile et al. |
| 6,193,519 B1 | | 2/2001 | Eggert et al. |
| 6,195,528 B1 | | 2/2001 | Young et al. |
| 6,213,780 B1 | | 4/2001 | Ho et al. |
| 6,287,123 B1 | | 9/2001 | O'Brien |
| 6,301,573 B1 | | 10/2001 | McIlwaine et al. |
| 6,302,698 B1 | | 10/2001 | Ziv-El |
| 6,324,282 B1 | | 11/2001 | McIllwaine et al. |
| 6,341,960 B1 | | 1/2002 | Frasson et al. |
| 6,347,333 B2 | | 2/2002 | Eisendrath et al. |
| 6,418,298 B1 | * | 7/2002 | Sonnenfeld .................. 434/350 |
| 6,594,466 B1 | * | 7/2003 | Harned et al. ............... 434/350 |
| 6,606,480 B1 | * | 8/2003 | L'Allier et al. ............. 434/362 |
| 6,767,211 B2 | * | 7/2004 | Hall et al. ................... 434/236 |
| 2002/0026537 A1 | | 2/2002 | Schlabach et al. |

OTHER PUBLICATIONS

"Object Oriented Education" by Burck Smith—Oct. 21, 1998 from wired.com/news/print/0,1294,15738,00.html.
"Early Object-Oriented Design" from http://www.mcs.vuw.ac.nz/comp/Research/design1.

* cited by examiner

*Primary Examiner*—Cameron Saadat

(57) ABSTRACT

The invention is a system and method for conveying information, job skills, academic courses, and/or other forms of learning (collectively "education"). The subject matter being taught is organized into small modular units called content modules. Content modules can be invoked in a highly flexible manner and order, based on interactions with the user. A learning matrix selectively identifies which content module is to be subsequently invoked, on the basis of user goals, test results, prerequisites relating to the subject matter, empirical evidence relating to how persons typically learn the particular subject, prior content modules invoked by the user, and/or any other potentially relevant characteristic. By incorporating information relating to the user, the user's performance, the subject matter, and/or empirical data relating to how people learn the specific subject matter, subsequent content modules can be selected to specifically tailor the learning process to the specific context of the user.

16 Claims, 14 Drawing Sheets

MODULE-BASED EDUCATION

BACKGROUND OF INVENTION

This invention relates generally to systems and methods for the providing of teaching and/or training. More specifically, the invention relates to a teaching and/or training approach that utilizes highly compartmentalized content modules, frequent individualized feedback, and a highly flexible, configurable, and targeted learning matrix for navigating the various content modules on an individualized basis using relevant data tracked by the system.

In a world of increasing technology, complexity, and specialization, the importance of education has never been greater. The increased demand for education is not limited to traditional academic environments such as colleges, universities, k-12 schooling, and other more traditional academic environments. Businesses, government entities at all levels, non-profit organizations, and other organizations increasingly provide job-related training, in addition to other forms of education, skill acquisition, and knowledge conveyance.

New academic subjects, job skills, and other forms of knowledge, information, analysis, techniques, and skills (collectively "knowledge" or "education") are being created every day. Some of the subject matter thought to be of crucial importance in the present is only a short number of years old. The impact of the every increasing aggregate knowledge base should not be underestimated. However, improvements with respect to education tools and methodologies to convey knowledge have been substantially more modest.

Many technology advances have spilled over into education systems. New technologies such as computers, the Internet, and other technological advancements (collectively "new technologies") have a significant presence in both academic and non-academic education environments. However, education systems have not been designed, implemented, or configured to take advantage of the iterative processing, database capabilities, and other advantages of the new technologies that would allow information to be taught in a fundamentally different way. Instead, new technologies are being used to simply automate old education processes that used to be manual processes. The improved opportunities for communication brought about by such new technologies is not to be underestimated. However, the new technologies have not been configured to adjust with the core issue of how people actually learn, and how technology can bring about fundamental improvements to the learning process. Whether the particular learner is a fast learner, a slow learner, or an average learner with respect to a particular subject matter, all learners can benefit from a more targeted, interactive, and modular approach.

Modern information conveyance techniques are not fundamentally different from those used in United States in the 1800's, and by other civilizations and cultures at even earlier times. The education process, including the knowledge and skill conveyance provided in non-academic environments, is highly linear. All students in the class are presented essentially the same material, in essentially the same fashion and order. This is despite the fact that each student brings a different knowledge base, a different past education history, different education goals, and different methods of learning. The existing linear system is thus less individualized than it should be. Quick, slow, and average learners alike are needlessly hampered by such linear and non-interactive education processes.

Even when taught on an individual basis, students and others to whom information, knowledge, and skills are to be conveyed (collectively "students" or "learners") are traditionally taught in a linear manner, with infrequent feedback relating to the student's acquisition of the desired skills, knowledge, and information. The characteristics of low interactivity and high linearity are particularly pronounced in formal academic environments, although non-academic environments suffer from similar limitations.

Semesters that typically span across a number of months constitute the primary building block of time in the education process. For example, a student's performance during the first few weeks of a semester-long course does not typically impact the materials taught during the last few weeks of that same semester-long course. In such a traditional environment, a student's failure to grasp critical material is not identified in a manner that impacts the student's curriculum until an inadequate grade for the course prevents satisfaction of a particular perquisite for a subsequent course or a graduation requirement. Moreover, if a student has a fundamentally inadequate or flawed understanding of a subset of the materials in a particular semester course, the student could pass the class, only to encounter trouble in subsequent courses due to a lack of understanding of the particular subset of materials. For example, an engineering student can "get by" in a particular mathematics course because a particular type of problem was merely one of many, only to find that the same particular type of problem is the basis for an entire advanced class of physics or engineering a year or two later.

The existing art does not identify the strengths and weaknesses of a student's performance in units that are small enough to optimize the learning opportunities of the student. Semester-long time frames are much longer than the "bandwidth" with which students learn. It would be desirable for the education process to be broken down into smaller modular learning units. This would facilitate the ability of a system to truly target the teaching process to the particular student or user.

The syllabus of a semester-long course is generally predetermined from start to finish in a very linear manner. In prior art systems and methodologies, subject matter is taught in a predetermined order that fails to take into account the specific difficulties and strengths of the students in the course. Similarly, the particular goals of the students are also ignored. For example, different "story problems" using differential equations or integral calculus should be used if a particular student is pre-med than if the student wants to be a mathematician.

It would be desirable to integrate all potentially relevant information relating to a student, including the student's learning goals, the subject matter(s) being studied, past performance on tests with regards to specific content, etc. into a single learning matrix that could manage the learning process for a student.

SUMMARY OF INVENTION

The invention is a system and/or method for conveying knowledge, skills, expertise, or other forms of information (collectively "education"). System functions can be provided by two primary subsystems, a content module subsystem and a module selection subsystem. Subject matter to be taught by the system is divided into a number of distinct content modules within the content module subsystem. The sequence of the various content modules invoked by the content modules subsystem is not predetermined in advance. Rather, it is the function of the module selection subsystem to determine the next content module in the sequence upon the completion of the preceding content module. Determinations of the module selection subsystem can be based on a numerous factors relating to the user (e.g. student), and the subject matter itself. Test results are one example of such potentially relevant factors or characteristics. A testing subsystem can include a wide assortment of tests, with some tests specifically tailored to be given before a particular content module and other tests specifically tailored to be given after a particular content module.

The system can provide instruction in a non-linear and highly interactive manner, tailoring the subject matter to be taught as much as possible to the specific circumstances, understanding, and goals of the user. In a preferred embodiment, each content module is preceded by a pre-content module test and a post-content module test follows each content module. The results of the various tests can then be incorporated into the decision making process of the module selection subsystem.

The foregoing and other functionality and features of the invention will be more apparent from the following description when taken in connection with the accompanying drawings.

DETAILED DESCRIPTION OF A PREFERRED EMBODIMENT

I. Introduction and Environmental View

Figure 1:
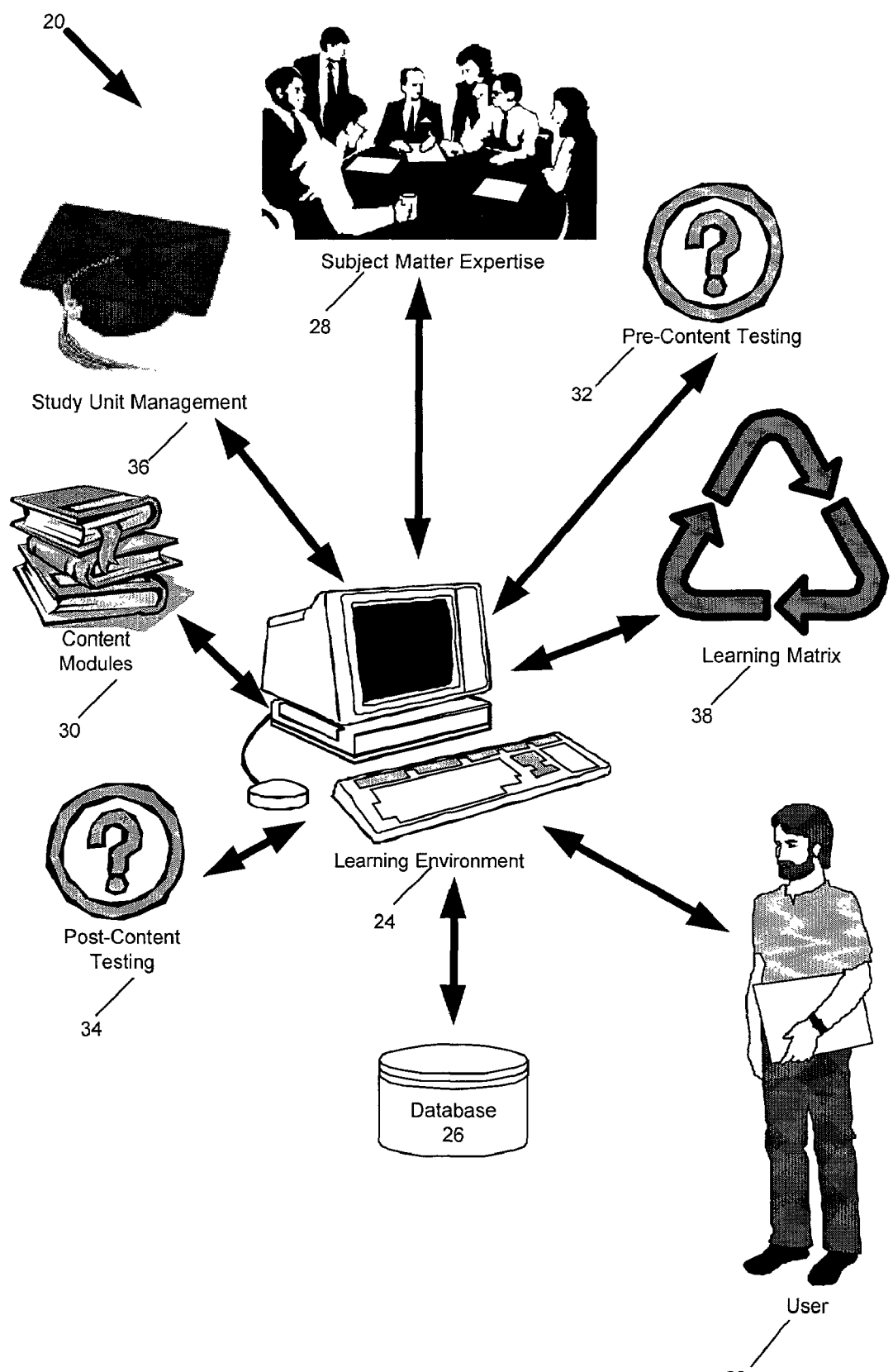
FIG. 1 is a partial environmental diagram illustrating one example of some of the various processes and information that can be incorporated into the system.

FIG. 1 is an environmental illustration of one example of a module-based education system 20.

A. User

A user 22 is the person to whom knowledge, information, data, techniques, skills, etc. (collectively "education") is to be conveyed. Users 22 can also be referred to as students, learners, knowledge recipients, trainees, skill acquirers, education recipients, or other receivers of teaching. Users 22 can be academic users in traditional academic environments such as colleges, universities, K-12 education, and other academic environments. Users 22 can also be non-academic users such as a employee in a job training program, a recipient of life-management skills from a government program, a would be citizen preparing for a U.S. citizenship exam, and any other contexts in which learning is a goal. Both academic and non-academic users 22 can be referred to as students, learners, skill acquirers, knowledge recipients, etc.

B. Learning Environment

A learning environment 24 is the interface between a user 22 and the system 20. The various learning environments 24 used by the system 20 can incorporate information technology tools such as computers to a wide variety of different degrees.

Any type of computational device can be a computer used by the system 20. Similarly, any type of communication device capable of communication with a computation device can be a computer used by the system 20. Desktop PCs; laptop PCs; networked computers; mainframes; mid-size computers and work stations; "dumb" terminals connected to a network, intranet, extranet, or the Internet; personal digital assistants; cell phones; cable TV; satellite TV; satellite radio; DVD players; and other devices can constitute "computers" that incorporate some or all of the processing performed by the system 20. In many embodiments, the learning environment 24 incorporates the use of a computer to at least some extent. For example, if subject matter is being taught live in a classroom, it is preferable for a pre-content test or a post-content test (both are described in greater detail below) be given electronically so that results may be more easily captured and incorporated into the system 20. However, the system 20 can be implemented without the use of any computers. Subject matter can be conveyed, test results captured, module sequences determined, etc. without any computers. Computers do provide a great tool for performing the functions of the system 20 in real-time for a potentially unlimited number of users 22 interested in a wide variety of different subject areas. The system 20 can incorporate future improvements in communications and computer technology.

In some preferred embodiments, the entire learning environment 24 is provided through one or more computers. If most or all of the education subject matter is to be delivered to users 22 via computer, it is preferable for the software used by the system 100 incorporate object-oriented technology and techniques. The modular approach of the system 20 is very conducive to such object-oriented approaches. Preferred embodiments of the system 20 can be said to apply some object-oriented themes, concepts, and techniques in order to achieve a truly "modular" education system 20. If the learning environment 24 includes a computer, the user-interface for the computer one mechanism by which the user 22 can invoke system 20 processing. The user-interface provides for the ability of the system 20 to interact with the user 22.

C. Database

A database 26 is included in preferred embodiments of the system 20. The ability of the system 20 to specifically tailor the learning process to a particular user 22 is greatly facilitated by the ability to capture, store, retrieve, analyze, and apply user-related and other forms of data. It is helpful to store as much information relating to the user 22 as possible. For example, while the performance of the user 22 with respect to sample math problems may not ultimately be included in the grade given the user 22 at the end of the semester, information relating to the types of problems that give the user 22 trouble may be very valuable in terms of the selecting of content to be provided to the user 22. For example, the user 22 may require more practice questions with respect to a particular type of questions as homework, based on difficulties associated with that particular type of question.

The system 20 can incorporate a wide variety of different database types, such as relational databases, hierarchical databases, object-oriented databases, or other forms of databases. Relational databases are generally preferred, although the type of database that is preferred is often related to the particular learning environment 24 and/or computer that is being used. In alternative embodiments, the database 26 can be an alternative form of data storage such as a series of flat files, arrays, or other types of data structures or data objects.

D. Subject Matter Expertise

Subject matter expertise 28 is an important part of the system 20. In some highly automated embodiments, subject matter is presented to users 22 in a prerecorded format. In such embodiments, there may not be a live "instructor" for the particular user 22. However, in some preferred embodiments, the user 22 is able to contact subject matter experts with specific questions regardless of whether an instructor is associated with the teaching of the user 22. A wide variety of different mechanisms can be used to provide responses to user 22 requests. The system 20 can include an expert consultation subsystem to facilitate communication between a subject matter expert and the user 22. Such communication can be one-on-one, or part of a group communication. Such communication can occur in "real time" or with slower mechanisms. Live oral discussion, teleconferencing through a computer, telephone calls, e-mail, instant messaging over the Internet, Internet chat room discussions, other forms of written correspondence, and any other mechanism for communication can be incorporated into the system 20. Just as users 22 can ask questions in a wide variety of different communication mediums, answers and other responses to those communications can be returned in an equally wide number of different communication mediums.

E. Content Modules

A content module 30 is the basic unit of information conveyance in the system 20. The subject matter expertise 28 to be conveyed by the system 20 is divided up into various content modules 30. Just as the variety of uses and users 22 of the system 20 can vary significantly, so can the different types of content modules. Academic content modules provide information for an academic field of study. Vocational content modules provide information relating to a vocation or job. Life enrichment/leisure content modules provide information relating to activities generally associated with hobbies or leisure. Cultural content modules provide information about other cultures and civilizations. Travel content modules provide information about travel destinations. Language content modules provide information about languages. The system 20 is content-independent or content "neutral." Content modules 30 can incorporate any type of subject matter that can be learned.

As discussed above, content modules 30 can be performed through a wide variety of different mediums. Pre-recorded computer software, videoconferencing, live instruction, pre-recorded video or DVD of "live" instruction, live Internet broadcasts, pre-recorded Internet broadcasts, pre-recorded DVD sessions, and a wide variety of other communication mediums can be used by the system 20. In a preferred embodiment, pre-recorded content modules 30 are used to facilitate individualized education. The use of live instruction, unless the instruction is one-on-one, typically fails to maximize modularity with respect to the learner (e.g. user 22).

In a preferred embodiment, content modules 30 include approximately 15 minutes of instruction time. Such a length is short enough to provide for frequent user 22 feedback and interactions, while long enough to present or at least introduce, a complex concept. Alternative embodiments can include significantly shorter content modules 30 (measured in seconds), significantly longer content modules (running up to 35 hours or even 350 hours of instruction time), and content modules of any length of time in between.

In a preferred embodiment, users 22 should be allowed to go forward, backward, stop, and pause material presentation as desired. Users 22 should also be allowed to leave and re-enter any presentations at the point at which they left.

F. Pre-Content Testing and Post-Content Testing

In order to facilitate non-linear learning, a preferred embodiment of the system 20 uses frequent testing to monitor the progress and specific strengths and weaknesses of users 22 with respect to the subject matter expertise 28. A preferred embodiment of the system 20 incorporates both a pre-content test 32 and a post-content test 34. Pre-content tests 32 are given before the content module 30 to determine what level of understanding the user 22 has of the subject matter before the subject matter is taught to the user 22. Post-content tests 34 are given after the content module 30 to determine what changes in the level of user 22 understanding have occurred, if any. Both pre-content tests 32 and post-content tests 34 should be as specifically tailored as possible, so that different categories of strengths and weaknesses can be identified and subsequently acted on the by system 20. For example, in a content module 30 teaching two-digit addition, the pre-content test 32 and post-content test 34 should be able to determine if the user 22 has trouble "carrying over" a digit from the "one's column" into the "ten's column." Highly modularized content in the form of content modules 30 couple with specific pre-content testing 32 and specific post-content testing 34 can facilitate better evaluations of what information users 22 have successfully learned, and what information needs to be reinforced or repeated.

Just as the selection of content modules can take into account a wide variety of potentially relevant characteristics, the selection of pre-content tests 32 and post-content tests 42 can also take into account wide variety of potentially relevant characteristics. For example, if a user 22 in a differential equation class is a pre-med student, story problems in a pre-content test 32 or a post-content test 34 can involve biological contexts. In contrast, if the user 22 is an electrical engineering student, the pre-content tests 32 and post-content tests 34 can involve problems relating to circuitry.

G. Study Unit Management

One component or module in a preferred embodiment of the system 20 is a study unit management module 36. The study unit management module 36 takes into account (e.g. incorporates) the relationships within and between the various content modules 30 and other units of subject matter content (such as a learning unit or a course unit, both of which are described below). For example, before the addition of two double-digit numbers can be taught, the user 22 must first understand the process of adding two single-digit numbers. The study unit management module 36 incorporates all potentially relevant content module 30 scheduling information that relates to the subject matter expertise 28, including proficiency requirements that may be required by the user 22 in order for the user 22 to proceed to subsequent content modules 30. In a conventional academic environment, curriculum requirements such as prerequisites, curriculum requirements for a particular major/minor, and other requirements and relationships are examples of study unit management 36 processing.

In a preferred embodiment of the system 20, subject matter expertise 28 is divided into many different and compartmentalized content modules 30 with many sophisticated and specific relationships between the content modules being incorporated into the study unit management component 36. Some relationships are individual, while other relationships may exist in the aggregate. In a preferred embodiment, the study unit management component 36 also incorporates the objectives and goals of the user 22 since it is the user 22 in a preferred embodiment who ultimately determines which knowledge is desired and why. However, certain goals necessitate a certain curriculum. For example, the desire to be pre-med means that a student needs to take biology. In some embodiments, the learning goals of the user 22 are less important. For example, the curriculum for a second grader is primarily imposed upon the student.

H. Learning Matrix

A learning matrix 38 is the means by which the system 20 selects subsequent content modules 30 for a particular user 22. In a preferred embodiment, a wide variety of user-based, content-based, and empirical/historical information is incorporated into the creation, implementation, maintenance, updating, and use of the learning matrix 38. A wide variety of different software techniques can be used to implement the learning matrix 38, including databases, arrays, objects, and other data structures and data relationship techniques. The learning matrix 38 serves as a cross-index between all of the characteristics that can impact content module 30 selection, and all of the various content modules 30.

II. Subsystem-Level View

Figure 2:
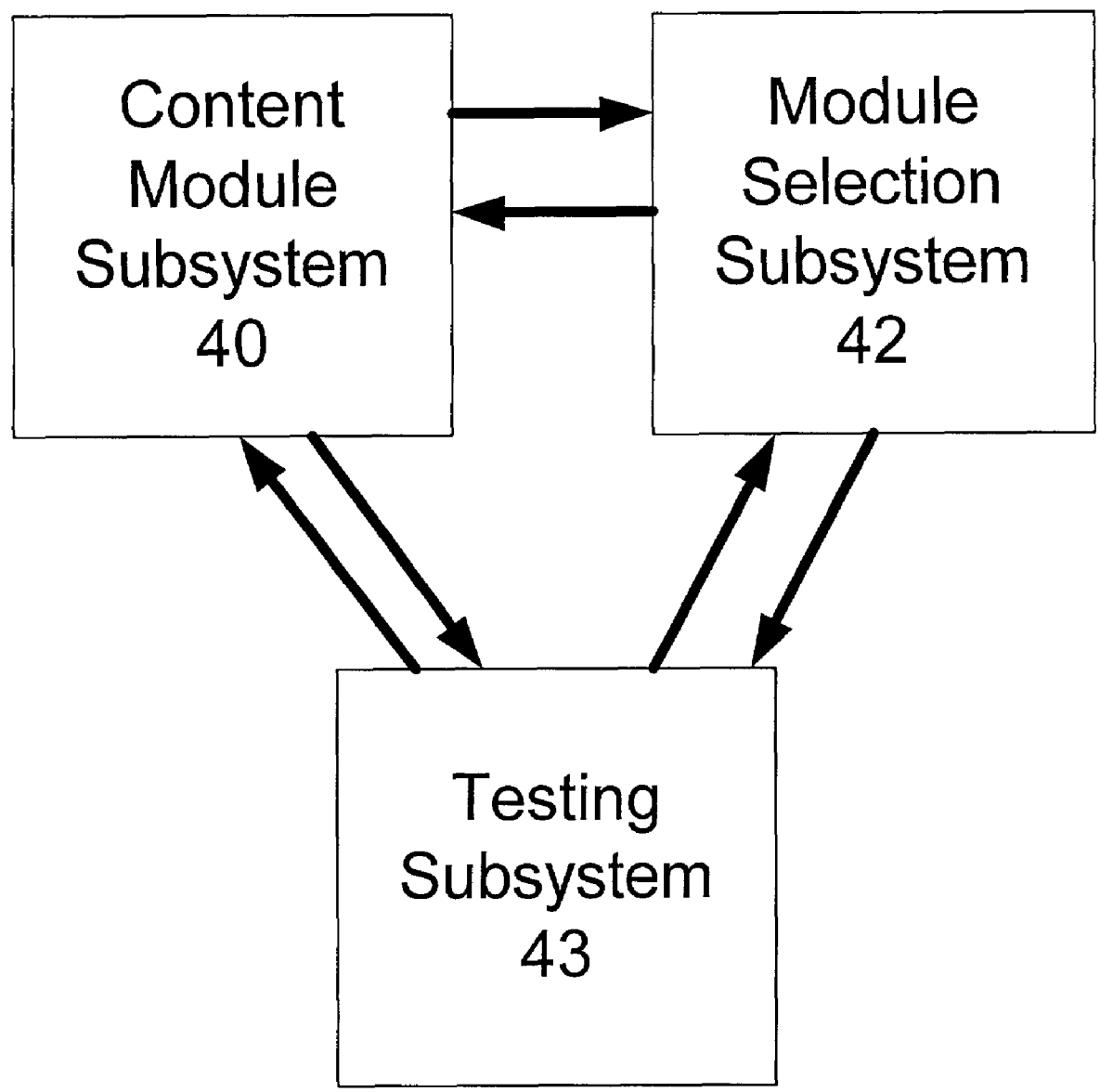
FIG. 2 is a flow chart illustrating one example of a subsystem-level view of the system, including a content modules subsystem, a module selection subsystem, and an optional testing subsystem.

The system 20 can be illustrated in terms of two primary subsystems. FIG. 2 is a flow chart illustrating one example of a subsystem-level view of the system 20, including a content modules subsystem 40 and a module selection subsystem 42. A testing subsystem 43 is also disclosed, but the testing subsystem 43 is optional, and thus some embodiments of the system 20 do not have the testing subsystem 43.

A. Content Subsystem

The content modules subsystem 40 can also be referred to as the content subsystem 40. All content modules 30 reside in the content subsystem 40. The content subsystem 40 is where relationships and data relating to the subject matter being taught is stored, awaiting invocation and/or processing by the module selection subsystem 42. Units of subject matter content such as learning units and course units (both of which are described below) can also reside in the content subsystem 40.

The content subsystem 40 can include components and functionality in addition to subject matter content such as content modules 30. The relationships between content modules 30 in the form of the study unit management component 36 can reside in the content subsystem 40. Similarly, pre-content tests 32 and post-content tests 32 preferably relate to specific content modules 30 and thus can also reside in the content subsystem 40. In contrast, the test results for a particular user 22 for a particular content module 30 is user specific, and thus in a preferred embodiment, that information is part of the module selection subsystem 42.

In a preferred embodiment, the content subsystem 40 includes a portion of the database 28 or its own distinct database 28.

B. Module Selection Subsystem

The module selection subsystem 42 is responsible for selecting subsequent content modules 30 for the user 22. The selection process can take into account user-specific data such as test results; the number of times the user 22 was taught the particular content module 30; the learning goals of the user 22; subject matter that the user 22 is particular adept at; subject matter that the user 22 has traditionally struggled with; and any other potentially relevant characteristics; into the processing performed by the module selection subsystem 42. The module selection subsystem 42 selects one content module 30 from a potentially voluminous number of potential subsequent content modules 30 upon the completion of the content module 30 and related content module 30 processing, such as prerequisite checks and other processing. The selection determination made by the module selection subsystem 42 can be automatically made by the system 20 without user 22 intervention or any other human intervention. The selectively identified content module 30 can be automatically invoked by the system 20 without any user 22 intervention or any other human intervention.

Unlike traditional education systems, the selection options of the module selection subsystem 42 are not limited to either "advancing to the next grade" or "failing." Instead an entire library of potential content modules 30 exist, allowing the module selection subsystem 42 to choose from a wide variety of potential subsequent content modules 30 in accordance with the learning matrix 38 described above and below.

The learning matrix 38 is an important part of the module selection subsystem 42. Pre-content test results 44, post-content test results 46, study unit management 36, pre-content tests 32, post-content tests 34, and other system 20 processes can also reside in the module selection subsystem 42.

In a preferred embodiment, the module selection subsystem 42 includes a portion of the database 28 or its own distinct database 28.

C. Testing Subsystem

A testing subsystem 43 is not a requirement for the system 20. No testing is required by the system 20 in order to function. Module selection can be performed without any use of tests or test results. Moreover, testing can be merely one of many different characteristics taken into consideration in a modular education approach. Thus, testing-related processes can be incorporated into the content subsystem 40 and module selection subsystem 42 as described above.

However, in a preferred embodiment of the system 20, testing plays a prominent role in tailoring the education experiences of the user 22. Pre-content testing 32, pre-content test results 44, post-content testing 34, post-content test results 46, and other forms of testing (collectively "testing") are a valuable source of interaction and feedback with users 22. Thus, testing processes can constitute a distinct subsystem 43 within the system 20. Test questions can be dynamically selected dynamically from a pool of potential test questions. The system 20 can track which test questions the user 22 has already been asked, to avoid asking the same user 22 the same question.

In a preferred embodiment, the testing subsystem 43 includes a portion of the database 28 or its own distinct database 28.

D. Expert Consultation Subsystem

FIG. 2 does not disclose the existence of an expert consultation subsystem, the existence of such a subsystem is not required by the system 20. However, as described above, users 22 can preferably contact subject matter experts 28 in order to receive answers to specific questions, follow-up response, and other forms of pre-recorded or non-pre-recorded feedback. The expert consultation subsystem facilitates such follow-up communication.

Expert consultation subsystem communication can be one-on-one, or part of a group communication. The communication can occur in "real time" or through slower mechanisms. Live oral discussion, teleconferencing through a computer, telephone calls, e-mail, instant messaging over the Internet, Internet chat room discussions, other forms of written correspondence, and any other mechanism for communication can be incorporated into the system 20. Responses from the subject matter experts 28 can similarly be communicated through a wide range of different communication mechanisms.

III. The Learning Matrix

Figure 3:
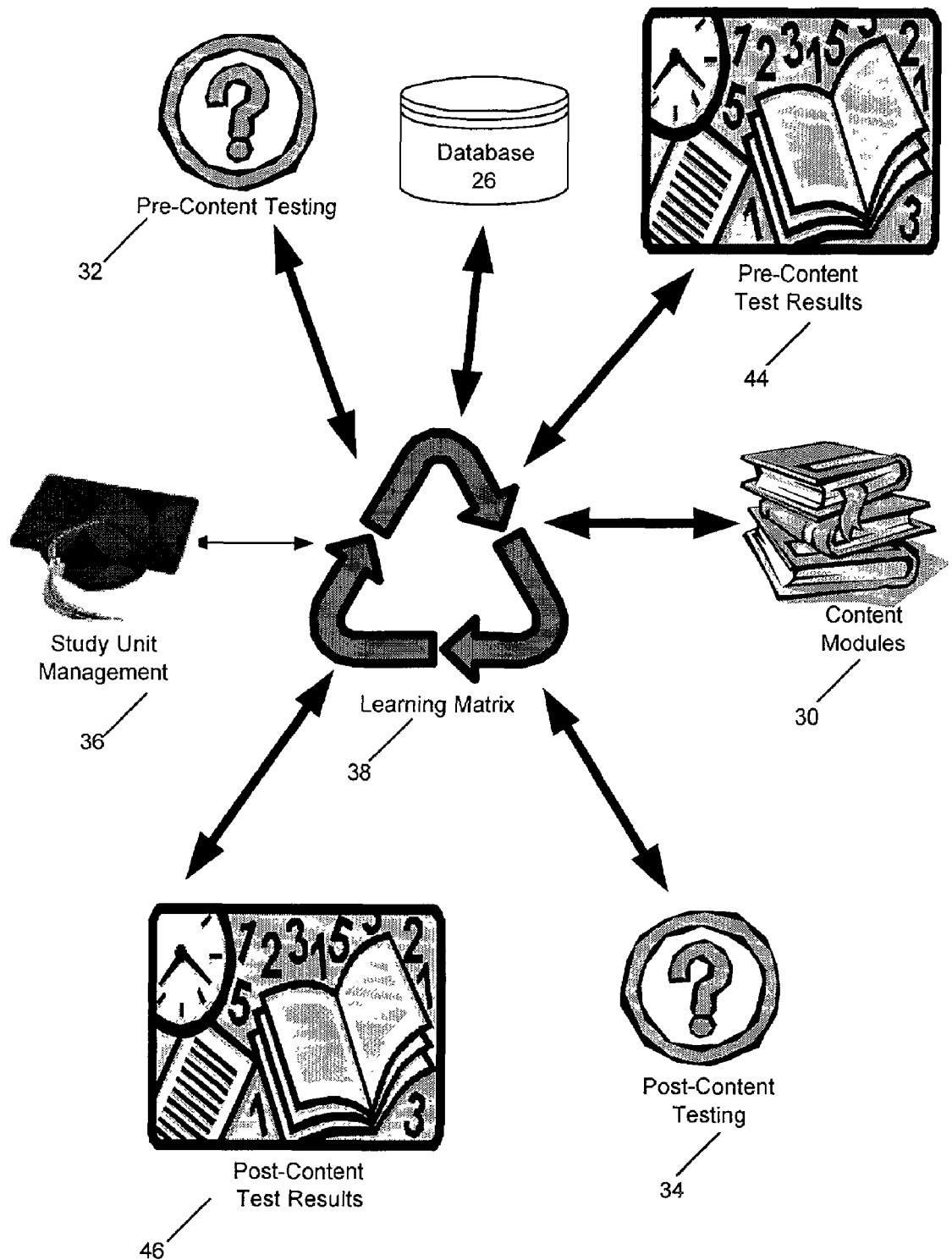
FIG. 3 is block diagram illustrating one example of a learning matrix that can be incorporated in the system, and some examples of the variables, data, attributes, and characteristics (collectively "characteristics") that can be incorporated into the module selection process.

FIG. 3 is a block diagram illustrating one example of the learning matrix 38 that can be incorporated in the system 20. FIG. 3 also provides some examples of the variables, data, attributes, and characteristics (collectively "characteristics") that can be incorporated into content module 30 selection process performed by the system 20.

The system 20 differs from prior art systems by preferably using a relatively large number of relatively small content modules 30. Thus, the system 20 does not utilize the regimented linear relationships found in the prior art. More flexible forms of navigation are used to move users 22 from one content module 30 to another content module 30. The learning matrix 38 is the mechanism to support such flexibility and modularity. The learning matrix 38 manages micro-requirements relating to the selection of content modules 30 and can incorporate global requirements such as matriculation requirements for the user 22 desiring to graduate with a degree in mechanical engineering. The relationship between content modules 30 and the larger subject matter units of learning units and course units is discussed below.

The learning matrix 38 takes into account (e.g. incorporates) the relationships between content modules 30. Although content modules are preferably not the rigidly linear academic units that are exemplified by a course sequence of Economics 101 and Economics 102, there are relationships between content modules 30 that should to be incorporated into the module selection process. The shorter and more numerous the modules 30, the more flexible and targeted the system 20 can be in providing subject matter expertise 28 to users 22.

The learning matrix can also distinguish different potential module selections based on tests that have been previously given the user 22, such as pre-content tests 32 and post-content tests 34. The results of those tests, both pre-content test results 44 and post-content test results 46, can preferably be taken into account in the resulting "decision" (e.g. subsequent content module 30 selection) by the learning matrix 38.

The study unit management component or module 36 can also provide potentially useful information in distinguishing between two or more potential content module 30 selections. As discussed above and below, the study unit management component 36 can include the global learning goals of the user 22, such as the professional certification for administrating a particular type of computer network.

The learning matrix 38 is not limited to information from the most recent content module 30 in selecting a subsequent content module 30. Information relating to the entire history of the user 22 can be stored in the database 26 for convenient access by the learning matrix. Thus, information relating to multiple past content modules 30 can be taken into consideration by the learning matrix 38. Aggregate characteristics relating to many different content modules 30, test results 42 and 44, and other characteristics, can be used by learning matrix 38. In some circumstances, weighted averages can be taken. Different weights can be used to emphasize recent characteristics in contrast to characteristics from further back in time, characteristics directly related to a particular characteristic in contrast to a mere ancillary relationship, changes in goals of the user 22, overall performance levels of the user 22, etc. There is no intrinsic limit to the number and types of distinguishing characteristics that can be incorporated into the learning matrix 38.

IV. Study Unit Management

Figure 4:
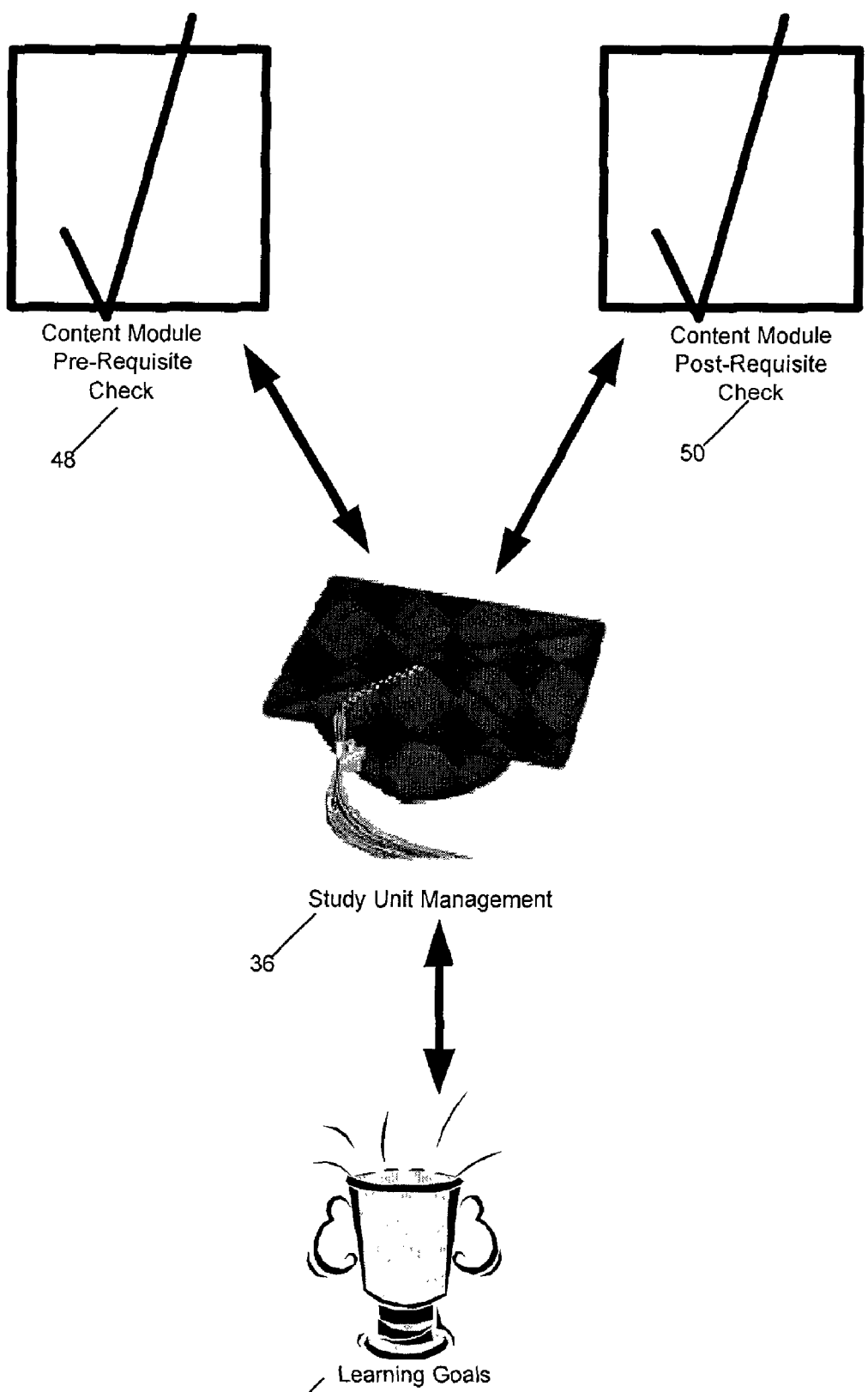
FIG. 4 is block diagram illustrating one example of the types of characteristics that interact with the study unit management component of the system.

FIG. 4 is block diagram illustrating one example of the types of characteristics that interact with the study unit management 36 aspects of the system 20. As discussed above, the study unit management component 36 incorporates information relating to a particular set of learning goals 52 of the user 22, in conjunction with the "curriculum" requirements relating to those learning goals, such as a content module pre-requisite check 48 and a content module post-requisite check 50. Although the system 20 is not limited to linear education progression, there are prerequisite requirements for content modules 30. For example, a computer programmer with no experience in writing programs in C++ should probably be required to take an entry-level content module 30 in C++ before taking an advanced C++ content module 30.

In many embodiments, the study unit management component 36 is predefined in advance by the subject matter experts 28. It is preferred for such subject matter expertise 28 to be accompanied by expertise relating to how users 22 learn the particular subject matter. For example, a course in mechanics for mechanical engineers is intrinsically going to require certain coursework in mathematics and physics. Such relationships exist between the various content modules 30 regardless of the particular abilities, experience, goals, test scores, and enthusiasm of the user 22. In a preferred embodiment, study unit management 36 takes into account all potentially relevant characteristics, including various standards by which particular user 22 characteristics can be compared against and evaluated. For example, in the context of a job training program for an administrative assistant, the study unit management component 36 can be embedded with the expertise that a person who types at less than 40 words per minute probably needs to spend more time on typing exercises. Thus, the study unit management component 36 can include numerous standards relating to test results and other characteristics that can become pre-requisite checks 48 and post-requisite checks 50.

In some embodiments of the system 20, historical and empirical data is used to define the relationships embedded in the study unit management component 36. For example, over time it may become known that users 22 who learn "concept A" before undertaking "concept B" have more success in then learning "concept B." The system 20 can then automatically change the study unit management component 36 to include "concept A" as a prerequisite for "concept B" even if the material could not be said to technically be a prerequisite. This change in the study unit management component 36 can be done automatically, without human intervention.

In a preferred embodiment, short and focused content modules 30 are the basic building blocks for the system 20. Study unit management 36 contains requirements and other relationship information at the content module level 30. However, many content modules 30 in the aggregate can make up a course unit as described below. A course unit can be a job training course, a semester course in an academic institution, or other course-level units of learning. Study unit management 36 functionality also manages the relationships of such larger units of learning. The ability and effects of aggregating content modules 30 is described in greater detail below.

V. Examples of Modular Processing

Figure 5:
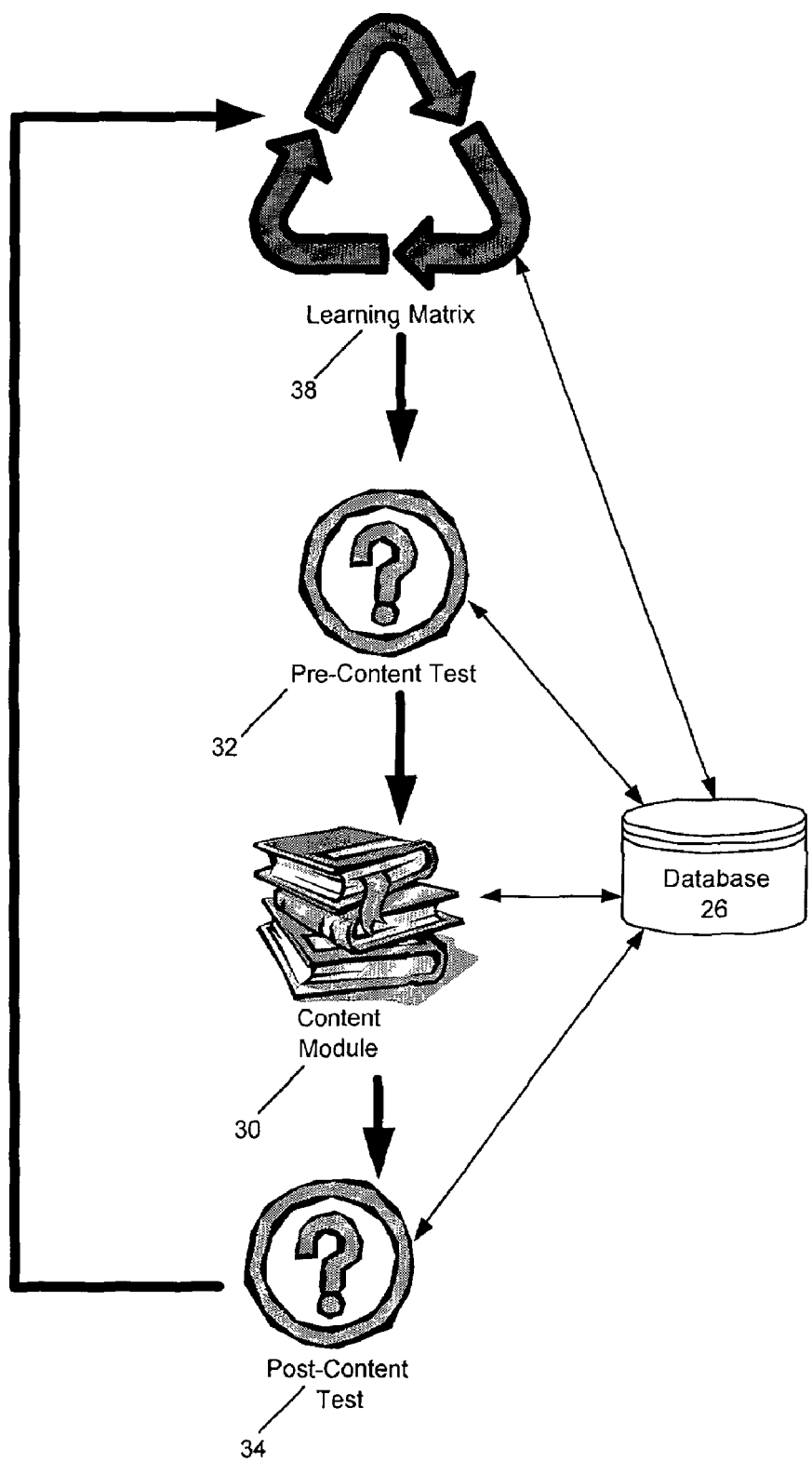
FIG. 5 is a flow chart illustrating one example of the learning matrix invoking a content module and processes affiliated with the content module.

FIG. 5 is a flow chart illustrating one example of the potential relationships between the learning matrix 38, content modules 30, and testing 32 and 34.

The learning matrix 38 described above, determines which subsequent content modules 30 are selected after the completion of a prior content module 30. In a preferred embodiment, each content module 30 can be affiliated with one or more pre-content tests 32 and post-content tests 34. If multiple potential pre-content tests 32 exist for a particular content module 30, then the learning matrix 38 determines the appropriate pre-content test 32. If only one potential pre-content test 32 exists for a particular content module 30, the learning matrix 38 selects the pre-content test 32 as a result of selecting the content module 30.

Completion of the pre-content test 32 triggers the content module 30. In some embodiments of the system 20, the results from the pre-content test 32 can trigger the invocation of a different content module 30. For example, the pre-content test 32 may indicate that the user 22 has already mastered the subject matter to be conveyed. In contrast, the pre-content test 32 may indicate that the user 22 does not have foundation necessary to fully understand the content of the content module 30 to be invoked. In most cases, the pre-content test 32 will not change the content module 30 being invoked because the pre-content test 32 is specifically created for use in conjunction with the particular content module 30.

The system 20 can support a wide variety of different pre-content tests 32 and post content tests 34. In a preferred embodiment, the content modules are approximately 15 minutes in length, and the pre-content tests 32 and post-content tests 34 are preferably no longer than five to ten minutes in length. However, the system 20 as mentioned above, can support content modules 30 ranging in length from mere seconds to those exceeding 350 hours in length. Preferably, neither pre-content tests 32 nor post-content tests 34 exceed the length of the content module 30 itself. However, in alternative embodiments, both pre-content tests 32 and/or post-content tests 34 can vary in length from mere seconds to hundreds of hours in length.

The content module 30 is described above. Content can be provided: through computer software embodying a "pre-recorded" presentation; using videoconferencing technology; as a (visual and/or audio) broadcast over the Internet or similar network; or through any other means, whether presently existing or invented in the future.

The completion of the content module 30 is followed by the post-content test 34. In some embodiments, the user's 22 behavior during the content module 30, pre-content test results 44, and other factors may impact which post-content test 34 is invoked. For example, in highly interactive and computer-intensive embodiments, the user 22 may be performing sample problems in the context of the content module 30. Such activities may point to particular problem areas that require extra attention in the form a more targeted post-content test 34.

After the post-content test 34 is completed, processing returns to the learning matrix 38 with the subsequent selection of the next content module 30 and related (e.g. affiliated) processing items such as pre-content tests 32 and post-content tests 34. The loop in the figure can repeat itself as many times as required until the user 22 achieves his or her learning goals 52.

In a preferred embodiment, each step in the process interacts with the database 28. All potentially relevant or useful information can be captured and stored in the database 28. In particular, any data relating to the user 22 may be of interest for future decisions by the system 20. Some embodiments of the system 20 may even track characteristics such as user 22 attentiveness, physical well-being, and general level of enthusiasm. Such information can be relevant to the education of the user 22. More conventional data illustrating user 22 characteristics can also be stored. All of the characteristics relating to content modules 30, pre-content tests 32, pre-content test results 44, post-content tests 34, post-content test results 44, and other processing encountered by the user 22 is preferably stored in the database 26. Empirical data for multiple users 22 can also be stored in the system 20, assisting the system 20 and the subject matter experts 28 to understand how students learn the particular subject matter. For example, if the empirical data shows that users taking content module A do better on content module C than users of content module B, the study unit management component 36 and the learning matrix 38 can be modified to enhance future learning. In general, as much information as possible should be stored. Database 28 data could also be used to identify the user 22 as belonging to one or more user categories using both aggregate user and specific user empirical data. While the comprehensive storage of data is desirable in many respects, corresponding efforts should also be taken to ensure that such information is not misused.

Figure 6:
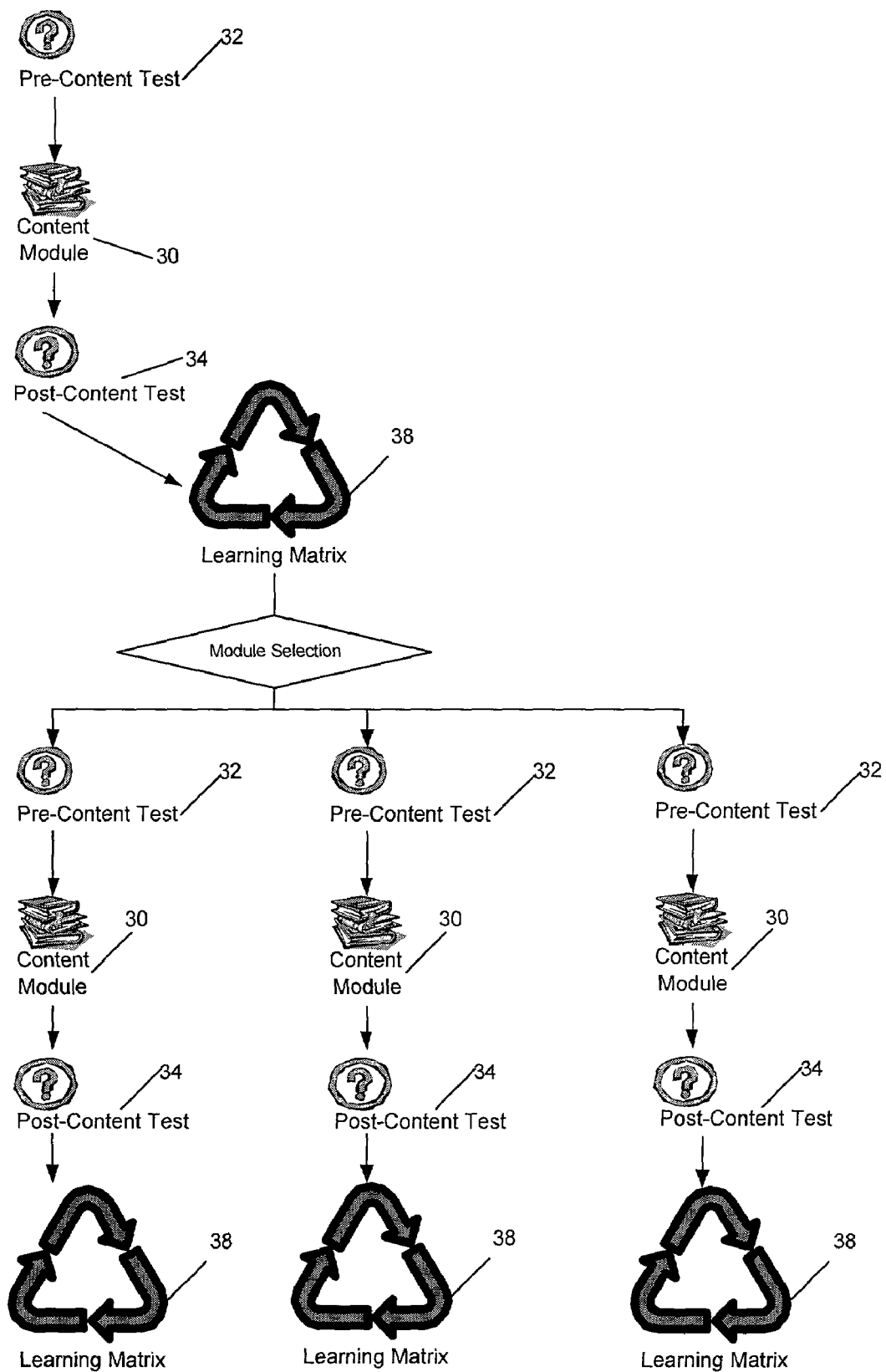
FIG. 6 is a flow chart illustrating one example how the learning matrix selects one subsequent content module from three potential subsequent processing modules based on processing relating to the last completed content module.

FIG. 6 is a flow chart illustrating one example how the learning matrix selects one subsequent content module 30 from three potential subsequent processing modules based on processing relating to the last completed content module 30. The learning matrix 38 takes as input prior processing relating to the pre-content test 32, the content module 30, and the post-content test 34. In a preferred embodiment, the learning matrix 38 can incorporate any past data or user characteristic that is potentially relevant to the determination of which subsequent content module 30 should be invoked. As the process flow in FIG. 6 makes clear, the completion of a single content module 30 can result in a large pool of subsequent content modules 30. FIG. 6 shows three potential follow-up content modules 30, but the system 20 can support a potentially unlimited number of subsequent content modules 30 depending on the context and particular embodiment of the system 20. Each loop in the process can increase the total number of module selection 30 sequences in a geometric or even exponential manner.

As illustrated at the bottom of FIG. 6, each subsequent content module 30 invokes the learning matrix 38, where the process of subsequent module selection can continue until the user 22 achieves his or her learning goals 52.

Figure 7:
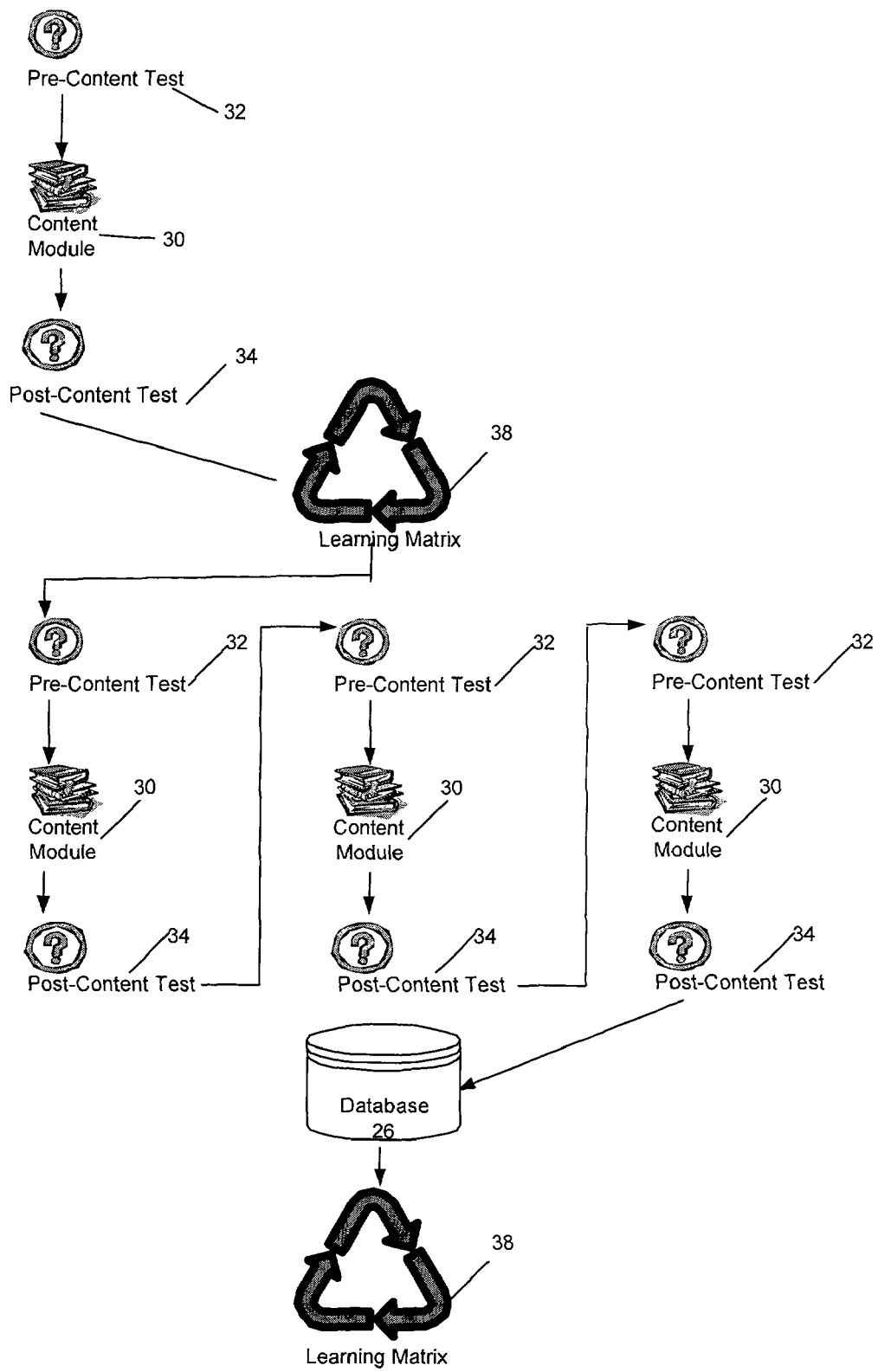
FIG. 7 is a flow chart illustrating one example of content module selection where aggregate processing and aggregate user results relating to more than one particular content module impact the determination of which content module is to be invoked next by the system.

The embodiment disclosed in FIG. 6 is a preferred embodiment because between every two invocations of a content module 30 is an invocation of the learning matrix 38. Similarly, between every two invocations of the learning matrix 38 is an invocation of a content module 30. In alternative embodiments, the system 20 need not be fully modularized, and certain content modules 30 are grouped together. FIG. 7 is an example of such an alternative embodiment.

FIG. 7 is a flow chart illustrating one example of content module selection where aggregate processing and aggregate user results relating to more than one particular content module impact the determination of which content module 30 is to be invoked next by the system 20. At the bottom of the FIG. 7, three content modules 30 are invoked between the two calls to the learning matrix 38. In this example, the results of the user's performance with respect to the three consecutive content modules 30 are not evaluated until all three content modules 30 (and all affiliated processing such as testing) have been completed. The example in FIG. 7 makes clear that the learning matrix 38 is not limited to referencing data relating to only one prior content module 30. The fully modularized embodiment in FIG. 6 can also support the learning matrix 38 looking beyond merely the last completed content module 30, subject to the constraints (if any) of the database 28.

VI. Learning Units

Figure 8:
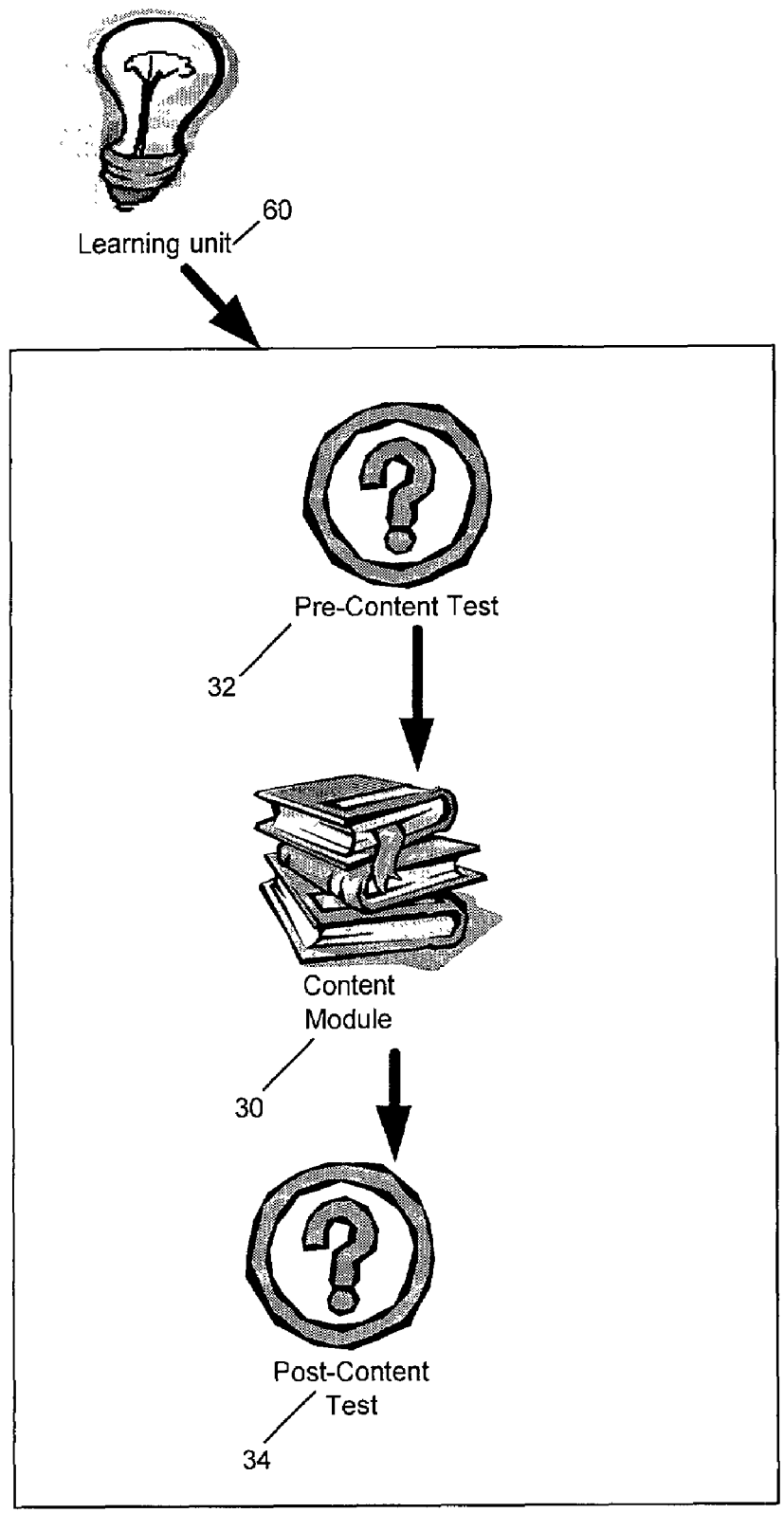
FIG. 8 is flow chart illustrating one example of the various processes that can make up a learning unit.

FIG. 8 is flow chart illustrating one example of the various processes that can make up a learning unit 60. As mentioned above, the content module 30 is the underlying building block of the system 20. However, in many preferred embodiments of the system 20, each content module 30 is preceded by a pre-content test 32 (for which the user 22 generates the corresponding pre-content test result 44). Similarly, each content module 30 is preferably followed by a post-content test 34 (for which the user generates the corresponding post-content test result 46). The learning unit 60 is a unit of education that incorporates the various elements (e.g. affiliated elements) that accompany the content module 30. In the language of an object-oriented software engineer, the learning unit 60 encapsulates the functionality of the content module 30 and the functionality that accompanies the invocation of the content module 30. Different embodiments of the system 20 can have learning units 60 with different components and processes.

Figure 9:
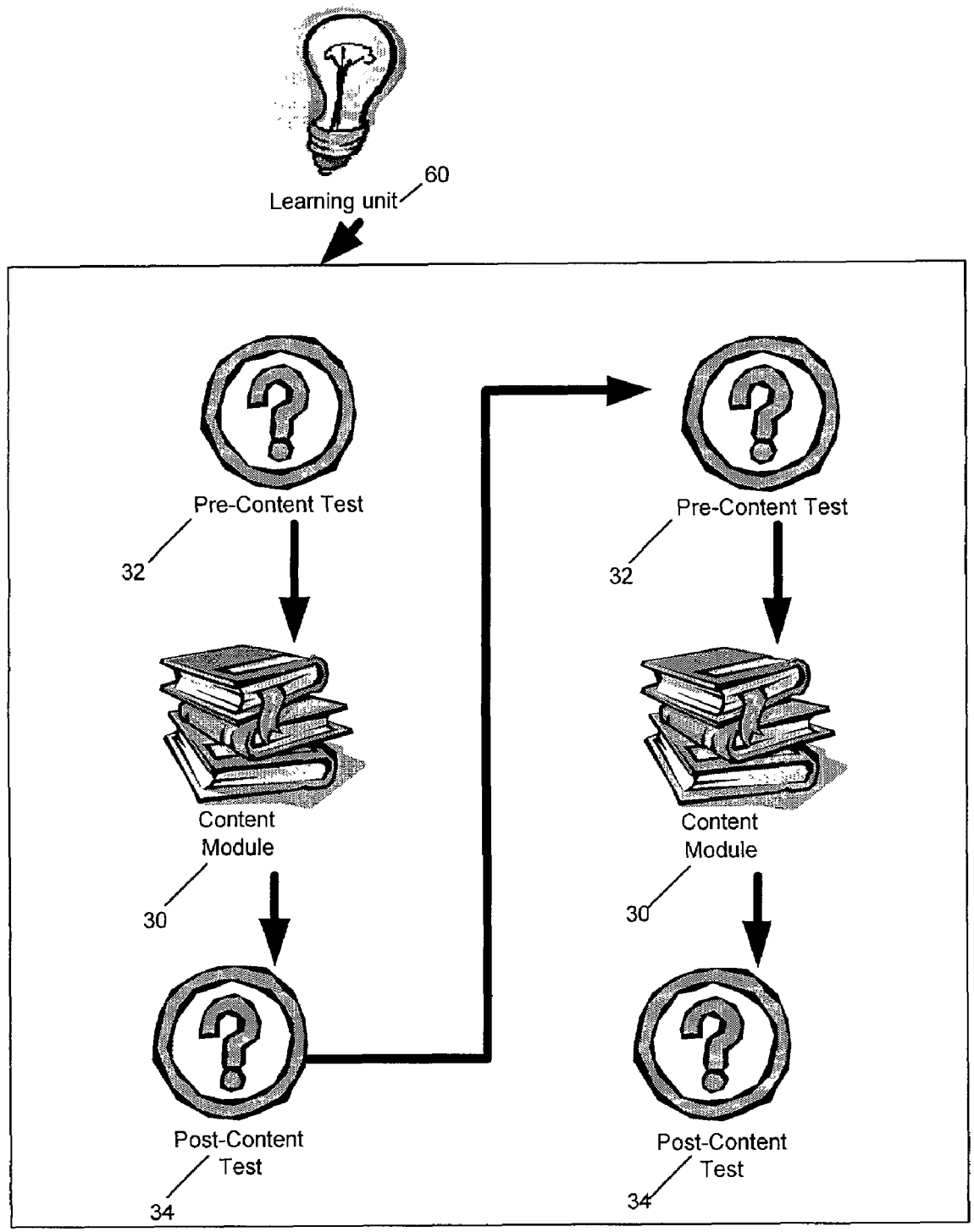
FIG. 9 is a flow chart illustrating one example of a learning unit that includes the invocation of two or more content modules.

FIG. 9 is a flow chart illustrating one example of a learning unit that is not fully modularized. In the example in FIG. 9, a series of content modules 30 are invoked within the same learning unit 60. In some respects, this alternative embodiment mirrors the example disclosed in FIG. 7 and discussed above. In a preferred embodiment, learning units 60 have only one content module 30, and an invocation of the learning matrix 38 occurs between every two content modules 30.

Figure 10:
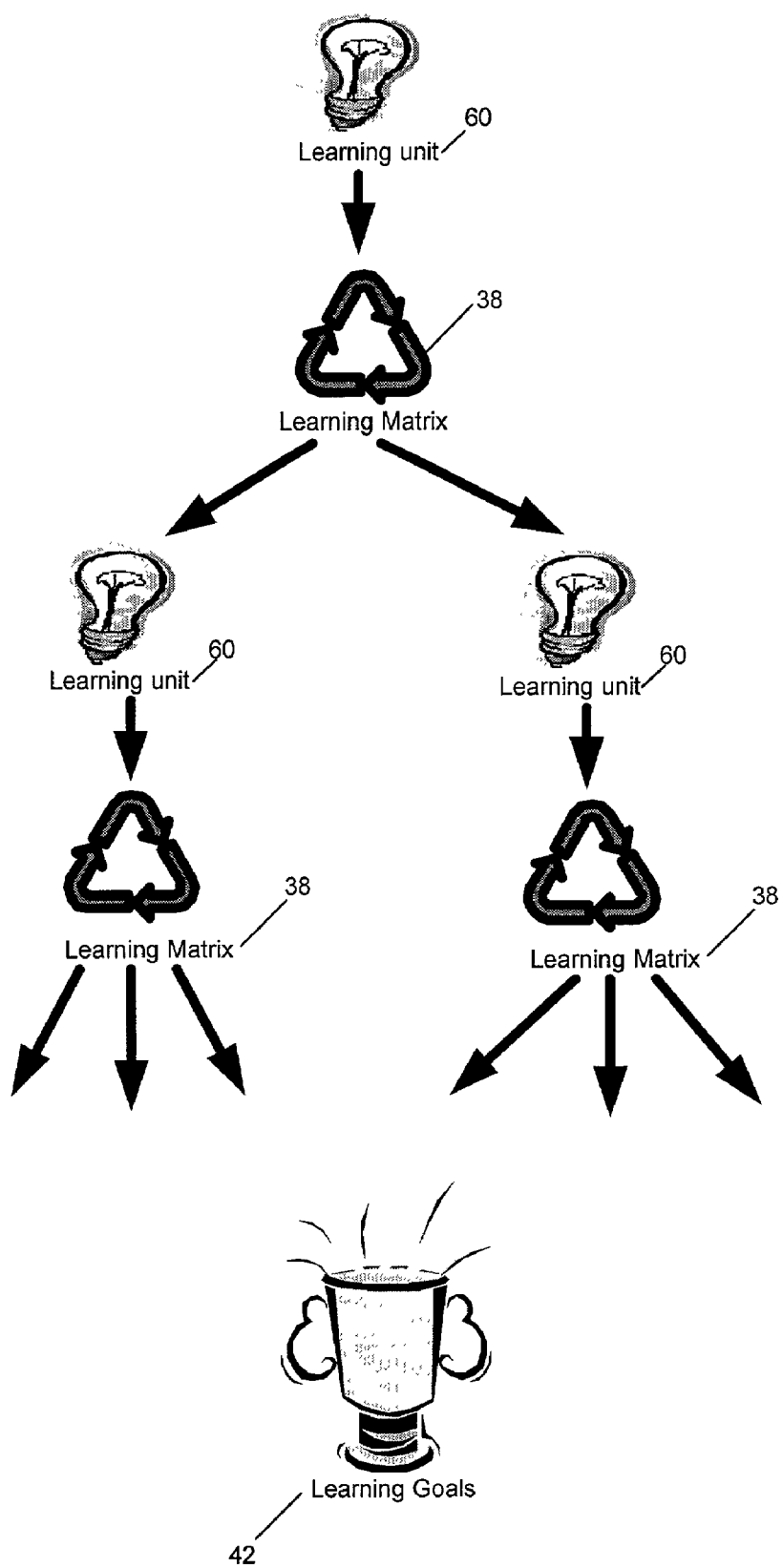
FIG. 10 is flow chart illustrating one example of a sequence of learning units being determined by the learning matrix in light of the learning goals of the particular user.

FIG. 10 is a flow chart illustrating one example of a sequence of learning units 60 being determined by the learning matrix 38, in light of the learning goals 52 of the particular user 22. The learning matrix 38 is invoked at the completion of each learning unit 60. No two learning units 60 are invoked consecutively without the learning matrix 38 being invoked in between. The potential number of different paths to the learning goals 52 of the user 22 is virtually limitless. Each learning unit 60 can trigger one of a potentially voluminous number of different subsequent learning units 60. Thus the system 20 can effectively target the education of the user 22 to the learning goals 52 of the user 22, all past performance characteristics relating to the user 22, and any other potentially relevant data that is stored on the database 26.

VII. Course Units

Figure 11:
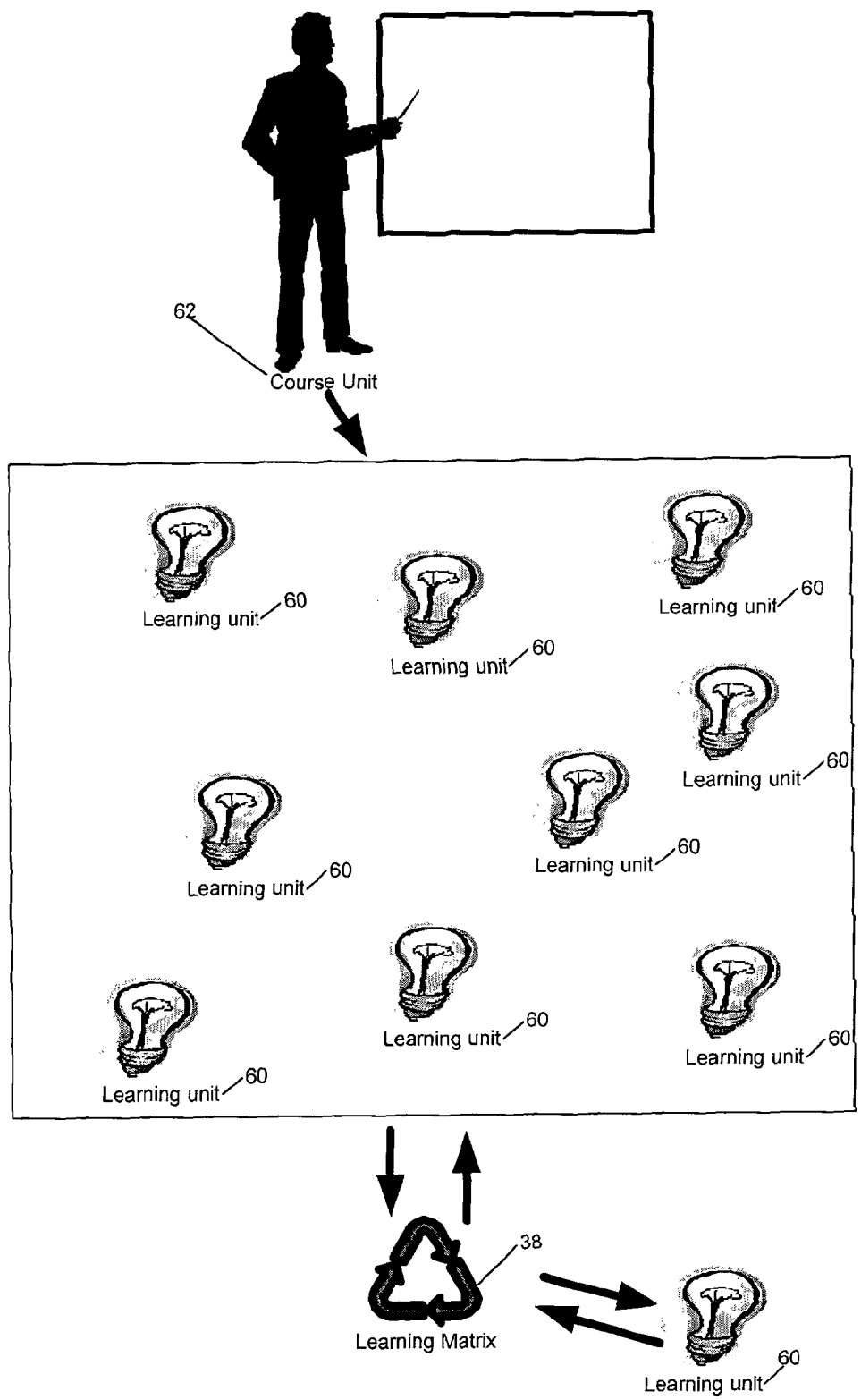
FIG. 11 is block diagram illustrating one example of how the learning units within a particular course unit are determined by the learning matrix.

FIG. 11 is a block diagram illustrating one example of the learning units 60 within a particular course unit 62 being selected by the learning matrix 38. Just as learning units 60 can include one or more different content modules 30 and related processing, course units 62 can include one or more different learning units 60 in addition to processing related to the particular learning units 60.

In FIG. 11, there are nine learning units 60 within the particular course unit 62. The selection and order of the various learning units 60 is made by the learning matrix 38. All of the learning units 60 within the course unit 62 need not ultimately be invoked. Moreover, in a preferred embodiment of the system 20, the learning matrix 38 can invoke learning units 60 outside of the course unit 62 in certain circumstances. For example, if the user 22 is clearly lacking an important prerequisite, the learning matrix 38 can invoke the learning unit 60 even though it is outside the scope of the course unit 62. This possibility is illustrated at the bottom of FIG. 11.

Course units 62 can have as few as one learning unit 60 or as many learning units 60 as are desired. The relationship of course units 62 and learning units 60 can be determined by subject matter experts 28, by historical/empirical data tracked by the system 20, and/or through other means, including weighted combinations of various different methodologies.

Figure 12:
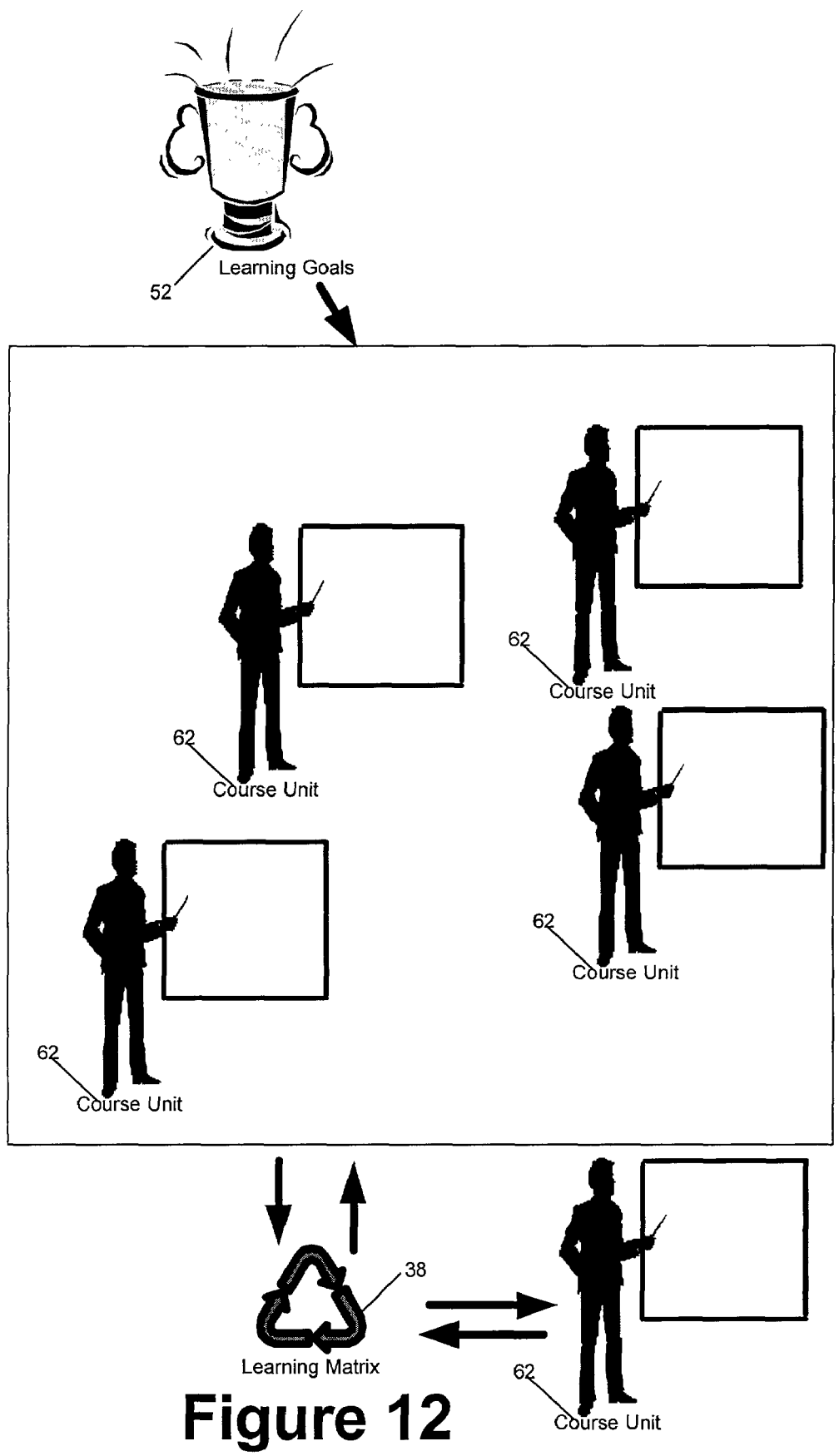
FIG. 12 is a block diagram illustrating one example of how the course units within a particular learning goal are determined by the learning matrix.

Just as many different learning units 60 can make up a course unit 62, achievement of the user's learning goals 52 can require the completion of potentially many different course units 62. FIG. 12 is a block diagram illustrating one example of course units 62 being selected within a particular learning goal 52. The learning matrix 38 selects which subsequent course unit(s) 62 are invoked after the completion of the preceding course unit(s) 62. Thus, the learning matrix 38 determines the sequence of the course units 62, in accordance with past data and characteristics relating to the user 22, the study unit management component 36, the learning goals 52 of the user 22, and other potentially relevant data.

In a preferred embodiment, course units 62 outside the scope of the user's 22 direct learning goals 52 can be selected by the learning matrix 38 in certain circumstances. For example, a person desiring a Ph.D. in economics or psychology will likely be required to take coursework in statistics even though such coursework is not directly desired by the user 22. Similarly, all of the potential course units 62 with the learning goals 52 of the user 22 need not ultimately be invoked in the achievement of the learning goal 52. The learning goal 52 consists of an entire universe of course units 62 that are potentially relevant.

VIII. Entity Relationships/Object Diagram

Figure 13:
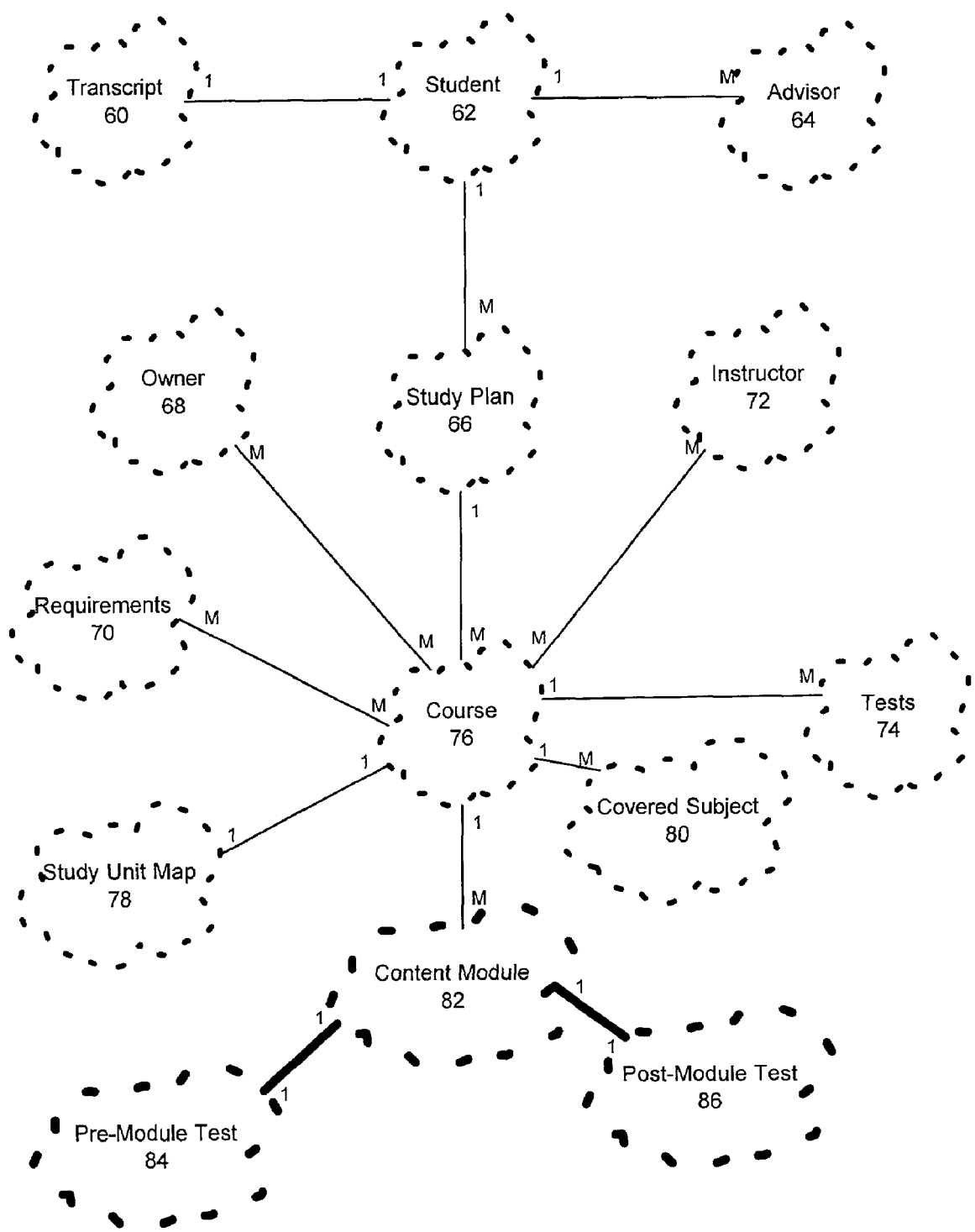
FIG. 13 is an object diagram illustrating one example of some of the entities and entity relationships that can be incorporated into the system.

FIG. 13 is an object diagram illustrating one example of some of the entities and entity relationships that can be incorporated into some of the different system 20 embodiments. Even though such embodiments deal with aggregated concerns at the course unit level 62 and the global perspective of learning goals 52, the underlying unit of the system 20 is still the content module 30.

A student object 62 stores information relating to the user 22 or student. A transcript object 60 can store the education history and other data of the student object 62. In a preferred embodiment, there is a one to one relationship between student objects 62 and transcript objects 60. In alternative embodiments, student objects 62 can have more than one transcript object 60, and a single transcript object 60 can belong to multiple student objects 62 if teams of students perform coursework in teams. An advisor object 64 represents the subject matter experts 28 and others who can advise the user 22 represented in the student object 62. In a preferred embodiment, student objects 62 can interact with many advisor objects 64. In alternative embodiments, student objects 62 can be limited to a single advisor object 64, or at least a single advisor object 64 for any particular period of time.

Student objects 62 can have one or more different study plan objects 66. Study plan objects 66 have course objects 76 that the student object 62 interacts with. A single study plan objects 66 can interact with multiple course objects 76 at the same time. Course objects 76 can correspond with the course units 62 described above.

A study unit map object 78, a requirements object 70, an instructor object 72, a test object 74, a covered subject object 80, an owner 68, and other objects can interact and have relationships with course objects 76. Many of these objects relate to the study unit management component 36 described above.

A preferred course object 76 can preferably have many test objects 74, many instructor objects 72, and many requirement objects 70. Alternative embodiments can incorporate any derivation of one-to-one, many-to-many, many-to-one, or one-to-many relationships between any of the objects in FIG. 13.

Just as course objects 76 have relationships with some of the more high-level education concerns illustrated in the figure, course objects 76 also have a relationship with content module objects 82 that can correspond with the content modules 30 discussed above. Similarly, content module objects can have relationships with pre-module test objects 84 and post-module test objects 86.

The object diagram in FIG. 13 is just one example of some of the entities and/or objects that can interact with each other in some of the various embodiments of the system 20. Variations can include different objects, few objects, a greater number of objects, enhanced differentiation between objects facilitated by object inheritance relationships, and other different combinations. Relationships can vary from embodiment to embodiment. Alternative embodiments can incorporate any derivation of one-to-one, many-to-many, many-to-one, or one-to-many relationships between any of the objects in FIG. 13.

IX. Teaching Administration

Figure 14:
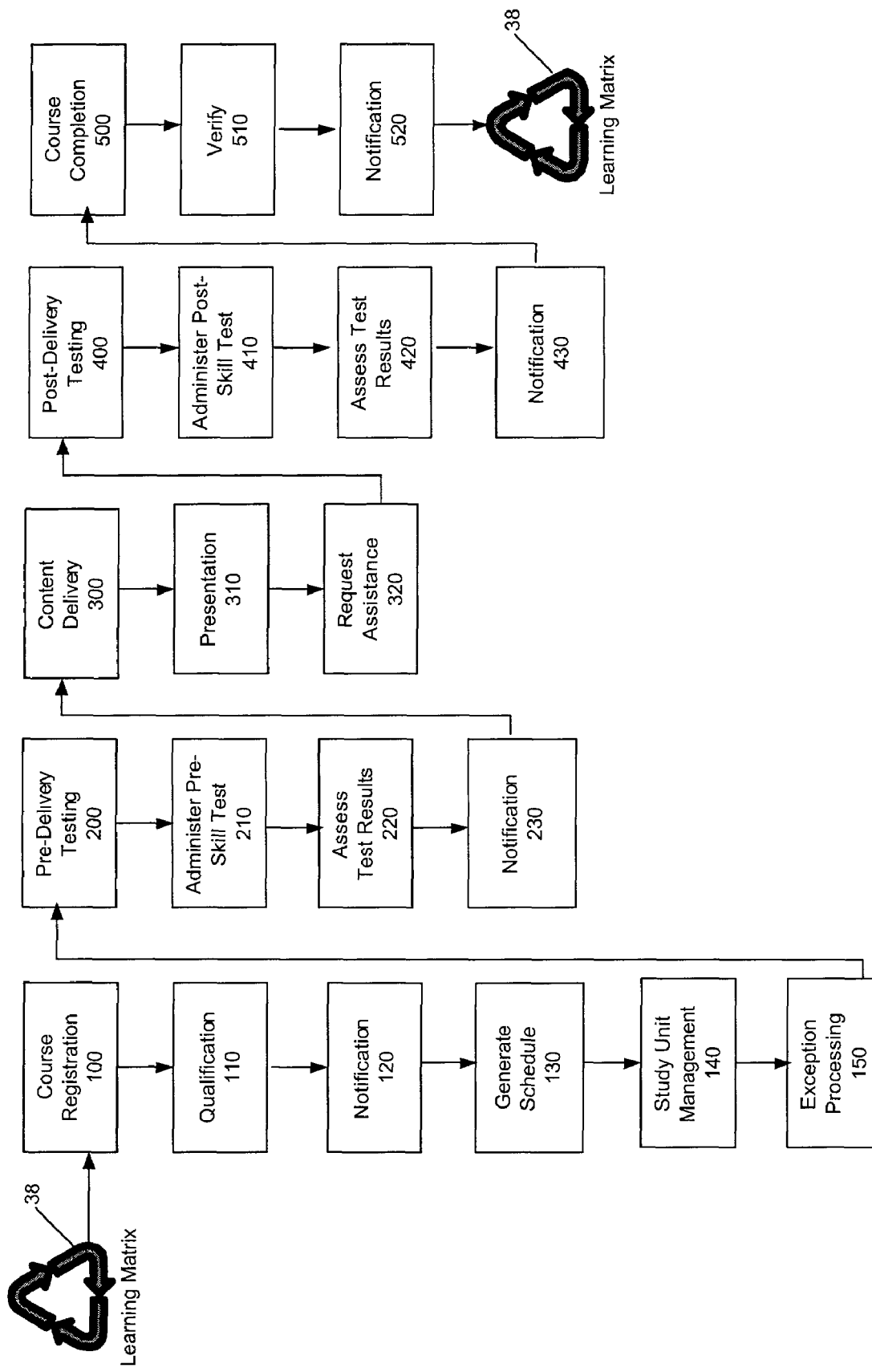
FIG. 14 is a flow chart illustrating one example of the use of the system in a traditional academic environment.

FIG. 14 is a flow chart illustrating one example of the use of the system 20 in a traditional academic environment. Analogous examples can be made of more formal, and yet non-academic, system 20 embodiments. Although the system 20 performs many high level functions, the various content modules 30 remain the underlying building block of the system 20.

Course registration occurs at 100. The first step in course registration 100 is qualification evaluation at 110. This step incorporates both the user's (e.g. student's) learning goals 52 and the study unit management component 36 created by the subject matter experts 28 and/or empirical data. The user's 22 qualifications are evaluated at 110. The student's administrative eligibility can be evaluated. For example, the person's status as a registered student can be confirmed. The availability of a particular course unit 62, in terms of general availability, administrative scheduling, and student prerequisites can be confirmed. In some embodiments, the system 20 can confirm that the student has an advisor. In some embodiments, the necessity of prerequisites can be overridden.

The second step of course registration 100 can be notification at 120. Notification appraises the appropriate elements of the system 20 regarding the student's progress and status. Transcripts can be updated, with the appropriate communications to instructors and advisors.

The third step of course registration 100 can be the generation of a course-unit 62 schedule at 130. Start and stop dates can be flexibly set in the system 20. Grade parameters can also be incorporated into the system 20. This leads to the fourth step in course registration 100, the performance of study unit management functions at 140. This step can also be referred to as progress management 140 to avoid confusion with the study management component 36 described above. Progress management 140 processing oversees potentially all aspects of the student's progression in a course unit 62, including registration detection, the recording of dropping/adding, the recording of taking a class on a pass/fail option, the monitoring of attendance, and the detection of course-unit 62 completion.

The final step of course registration 100 can be exception processing at 150. Exceptions at 150 can be made with respect to registration, student eligibility, drops/ads, attendance exceptions, and any other characteristic relating to course registrations at 100.

Before content delivery at 300 is the process of pre-delivery testing at 200. Pre-delivery testing at 200 can be identical to pre-content testing at 32. In alternative embodiments, pre-delivery testing at 200 parallels the more aggregated education unit of the course unit 62 and is affiliated with a particular course unit 62 in the same way that a pre-content test 32 is affiliated with a particular content module 32. In either case, the pre-skill tests is administered at 210. The results of the test are assessed at 220. Answers can be analyzed. The student can be instructed to retake the test in certain circumstances. Subject matter experts 28 can be asked to review the contents and validity of the test. Notification of the test results occurs at 230. Transcripts can be updated, with information communicated to instructor(s), advisor(s), etc.

Content delivery occurs at 300. As discussed above, content delivery 300 is preferably performed at the content module 30 level. Many different content modules 30 can be included in the subject matter of a course unit 62. Students should be allowed to go forward, backward, stop, and pause material presentation as desired at 310. Students should also be allowed to leave and re-enter any presentations at the point in which they left. At any point during content delivery 300, students should be able to request and receive assistance at 320.

Post-delivery testing can then be performed at 400. Post-delivery testing at 400 can be identical to post-content testing at 34. In alternative embodiments, post-delivery testing at 400 parallels the more aggregated education unit of the course unit 62 and is affiliated with a particular course unit 62 in the way that a post-content test 34 is affiliated with a content module. The results of the test are assessed at 420. Answers can be analyzed. The student can be instructed to retake the test in certain circumstances. Subject matter experts 28 can be asked to review the contents and validity of the test. Notification of the test results occurs at 430. Transcripts can be updated, with information communicated to instructor(s), advisor(s), etc.

Course completion can then be performed at 500. This preferably includes verifying completion at 510 and then providing notification at 520. The verification at 510 can include determining the educational units completed, at the content module 30, learning unit 60, and/or course unit 62 levels. Grades can also be determined. Notification at 520 should include updates to the transcript, and communications to instructors, advisors, and students.

X. Alternative Embodiments

Although a few exemplary embodiments of this invention have been described in detail above, those skilled in the art will appreciate that many modifications are possible in the exemplary embodiments without materially departing from the novel teachings and advantages of this invention. Accordingly, all such modifications are intended to be included within the scope of this invention as defined in the following claims, which should be construed as broadly as the prior art will allow. Moreover, the headings included herein are for the convenience of the reader and should not be construed in any manner that would limit the scope of the claimed invention.

What is claimed is:

1. A knowledge conveyance system comprising:
    a computer and a computer program, wherein said computer provides for running said computer program;
    wherein said computer program provides for a content subsystem, a module selection subsystem, and a user attribute;
    said content subsystem including a plurality of content modules, said plurality of content modules comprising a first content module and a plurality of potential subsequent content modules;
    wherein said module selection subsystem provides for selectively identifying a second content module from said plurality of subsequent content modules;
    wherein said second content module is not identified until after the completion of said first content module;
    wherein said at least one of: (a) said first content module and (b) said second content module is selectively modified using said user attribute;
    wherein each said content module in said plurality of content modules is capable of being completed in less than about forty-five minutes;
    further comprising a learning goal, a plurality of course units, and a plurality of learning units, wherein said learning goal includes one or more of said course units, wherein each said course units includes one or more said learning units, and wherein each said learning unit includes one or more said content modules.

2. The system of claim 1, wherein at least one said content module in said plurality of content modules comprises a videoconferencing mechanism capable of be selectively invoked by said computer program, wherein the selective invocation by said computer program is triggered by at least one of: (a) a user attribute; (b) a content attribute; and (c) an empirical attribute.

3. The system of claim 1, wherein said computer program provides for a plurality of user attributes, and wherein said plurality of user attributes includes (a) a learning ability assessment; (b) a goal; (c) a pre-content test result; (d) a post-content test result; and (e) a learning history attribute.

4. The system of claim 1, said computer program further providing for an expert consultation subsystem, said expert consultation subsystem including a user interface and an expert interface; wherein a question is submitted from said user interface to said expert interface; wherein a response to said question is sent from said expert interface to said user interface, wherein said question is submitted during a first content module, and wherein each content module in said plurality of content modules includes less than about 20 minutes of instruction time.

5. The system of claim 4, wherein said question is sent to said expert interface in a substantially real-time manner and said response to said question is sent to said user interface in a substantially real-time manner.

6. The system of claim 5, wherein said question is sent in the form of an instant message and said response is sent in the form of an instant message.

7. The system of claim 1, said computer program further providing for a testing subsystem, said testing subsystem including a pre-content test and a pre-content test result, wherein said pre-content test result influences the selective identification of said second content module.

8. The system of claim 1, said computer program further providing for a testing subsystem, said testing subsystem including a post-content test and a post-content test result, wherein said post-content test result influences the selective identification of said second content module.

9. The system of claim 1, said computer program further providing for a testing subsystem, said testing subsystem including a plurality of tests, wherein said content subsystem uses said user attribute to selectively modify at least one said test.

10. The system of claim 1, wherein at least one said content module delivers some content information to a user interface for said computer program and wherein said user attribute is captured through said user interface.

11. The system of claim 10, wherein a plurality of user attributes are captured through said user interface, wherein said plurality of user attributes include a user-supplied goal and a historical metric.

12. The system of claim 1, said computer program further providing for a testing subsystem, wherein said testing subsystem provides for a plurality of pre-content tests and a plurality of post-content tests, wherein said testing subsystem provides for selectively modifying at least one said pre-content test or one said post-content test using said user attribute.

13. The system of claim 1, wherein said plurality of content modules include a plurality of academic content modules.

14. The system of claim 1, wherein said plurality of content modules include a plurality of vocational content modules.

15. The system of claim 1, said computer program further providing for a plurality of past test results from a plurality of past content modules, wherein said plurality of past test results influences the selective identification of said second content module by said module selection subsystem.

16. The system of claim 1, wherein a certification is awarded after the completion of said second content module.

* * * * *